United States Patent
Mathew et al.

(10) Patent No.: US 11,018,904 B1
(45) Date of Patent: May 25, 2021

(54) EQUALIZATION FOR A TRANSMITTER CIRCUIT

(71) Applicant: QUALCOMM Incorporated, San Diego, CA (US)

(72) Inventors: Prince Mathew, San Diego, CA (US); Ashwin Sethuram, San Clemente, CA (US); Patrick Isakanian, El Dorado Hills, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 0 days.

(21) Appl. No.: 16/729,665

(22) Filed: Dec. 30, 2019

(51) Int. Cl.
| | | |
|---|---|---|
| *H04L 27/00* | (2006.01) | |
| *H04L 25/03* | (2006.01) | |
| *G06F 13/16* | (2006.01) | |
| *H04L 7/033* | (2006.01) | |
| *H04L 7/00* | (2006.01) | |
| *H03H 7/30* | (2006.01) | |

(52) U.S. Cl.
CPC ...... *H04L 25/03057* (2013.01); *G06F 13/161* (2013.01); *H04L 7/0087* (2013.01); *H04L 7/033* (2013.01); *H04L 25/03114* (2013.01); *H04L 25/03343* (2013.01); *H04L 25/03878* (2013.01)

(58) Field of Classification Search
CPC . H04L 25/03057; H04L 7/0087; H04L 7/033; H04L 25/03114; H04L 25/03343; H04L 25/03878; G06F 13/161
USPC .................. 375/229, 233, 256; 333/18, 28 R
See application file for complete search history.

(56) References Cited

U.S. PATENT DOCUMENTS

| | | | | |
|---|---|---|---|---|
| 2005/0134306 | A1* | 6/2005 | Stojanovic | ........ H04L 25/03019 326/31 |
| 2011/0158019 | A1* | 6/2011 | Jung | ................... G11C 11/4097 365/203 |
| 2012/0201289 | A1* | 8/2012 | Abdalla | ............ H04L 25/03057 375/233 |
| 2018/0278440 | A1* | 9/2018 | Dong | ................ H04L 25/03343 |

OTHER PUBLICATIONS

Jiang Xu et al., "Double-Data-Rate, Wave-Pipelined Interconnect for Asynchronous Nocs" IEEE Micro, pp. 20-30, May/Jun. 2009.*
Bae S.J., et al., "A 40nm 7Gb/s/pin Single-ended Transceiver with Jitter and ISI Reduction Techniques for High-Speed DRAM Interface," 2010 Symposium on VLSI Circuits/Technical Digest of Technical Papers, 2010, IEEE, pp. 193-194.

* cited by examiner

*Primary Examiner* — Tesfaldet Bocure
(74) *Attorney, Agent, or Firm* — Patterson + Sheridan, L.L.P.

(57) ABSTRACT

Certain aspects of the present disclosure provide methods and apparatus for equalizing a transmitter circuit for use in high-speed data links, such as in a serializer/deserializer (SerDes) scheme. One example transmitter circuit generally includes at least one driver stage, a first equalization circuit coupled to an output of the transmitter circuit, and a second equalization circuit coupled to an input of the at least one driver stage. One example method of transmitting data generally includes operating a transmit circuit comprising: at least one driver stage, a first equalization circuit coupled to an output of the transmitter circuit, and a second equalization circuit coupled to an input of the at least one driver stage; and selectively enabling at least one of the first equalization circuit or the second equalization circuit.

19 Claims, 5 Drawing Sheets

EQUALIZATION FOR A TRANSMITTER CIRCUIT

TECHNICAL FIELD

The teachings of the present disclosure relate generally to electronic circuits, and more particularly, to an equalizing scheme for a transmitter circuit used in high-speed data links.

BACKGROUND

With the increasing complexity of integrated circuits, high-performance data processing applications are driving a demand for data transmission working in the gigahertz range. Simultaneously, a corresponding high-performance bus interface technology is being developed to meet the needs between processors and systems. Conventional interface speed increases may result in signal degradation caused by time dispersion, reflections, and undesired environment condition fluctuations.

BRIEF SUMMARY

The following presents a simplified summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a simplified form as a prelude to the more detailed description that is presented later.

Certain aspects of the present disclosure are generally directed to circuitry for signal equalization in transmitter circuits, such as serializer/deserializer (SerDes) transmitter circuits, which may be used for high-speed data links.

Certain aspects provide a transmitter circuit that generally includes at least one driver stage; a first equalization circuit coupled to an output of the transmitter circuit; and a second equalization circuit coupled to an input of the at least one driver stage.

In an aspect, the first equalization circuit is configured to be selectively enabled.

In an aspect, the second equalization circuit is configured to be selectively enabled, such that at a particular time both the first and second equalization circuits may be enabled, either the first or the second equalization circuit may be enabled, or neither the first or the second equalization circuit may be enabled.

In an aspect, the second equalization circuit is configured to be selectively enabled.

In an aspect, the at least one driver stage comprises a first pre-driver stage and a driver stage, an output of the first pre-driver stage is coupled to an input of the driver stage, and an output of the first equalization circuit is coupled to an output of the driver stage.

In an aspect, the transmitter circuit further comprises a second pre-driver stage, wherein an input of the second pre-driver stage is coupled to an input of the first pre-driver stage and wherein an output of the second pre-driver stage is coupled to an input of the first equalization circuit.

In an aspect, the at least one driver stage further comprises a buffer stage having an output coupled to the input of the first pre-driver stage, and an output of the second equalization circuit is coupled to the output of the buffer stage.

In an aspect, the second equalization circuit comprises at least one controlled delay cell.

In an aspect, the transmitter circuit is a low-power double data rate (LPDDR) transmitter circuit.

Certain aspects provide a method of transmitting data. The method generally includes operating a transmitter circuit comprising: at least one driver stage; a first equalization circuit coupled to an output of the transmitter circuit; and a second equalization circuit coupled to an input of the at least one driver stage; and selectively enabling at least one of the first equalization circuit or the second equalization circuit.

In an aspect, the selectively enabling comprises selectively enabling both the first equalization circuit and the second equalization circuit.

In an aspect, the at least one driver stage comprises a first pre-driver stage and a driver stage, and the operating comprises: amplifying an input signal with the first pre-driver stage to generate an amplified input signal; and transmitting the input signal with the driver stage, wherein an output of the first equalization circuit is coupled to an output of the driver stage.

In an aspect, the at least one driver stage further comprises a buffer stage; the operating further comprises buffering a data signal for the transmitter circuit with the buffer stage; the input signal comprises the buffered data signal; and an output of the second equalization circuit is coupled to the output of the buffer stage.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well-known structures and components are shown in block diagram form in order to avoid obscuring such concepts.

The various aspects will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

The terms "computing device" and "mobile device" are used interchangeably herein to refer to any one or all of servers, personal computers, smartphones, cellular telephones, tablet computers, laptop computers, netbooks, ultrabooks, palm-top computers, personal data assistants (PDAs), wireless electronic mail receivers, multimedia Internet-enabled cellular telephones, Global Positioning System (GPS) receivers, wireless gaming controllers, and similar personal electronic devices which include a programmable processor. While the various aspects are particularly useful in mobile devices (e.g., smartphones, laptop computers, etc.), which have limited resources (e.g., processing power, battery, size, etc.), the aspects are generally useful in any computing device that may benefit from improved processor performance and reduced energy consumption.

The term "multicore processor" is used herein to refer to a single integrated circuit (IC) chip or chip package that contains two or more independent processing units or cores (e.g., CPU cores, etc.) configured to read and execute program instructions. The term "multiprocessor" is used herein to refer to a system or device that includes two or more processing units configured to read and execute program instructions.

The term "system on chip" (SoC) is used herein to refer to a single integrated circuit (IC) chip that contains multiple resources and/or processors integrated on a single substrate. A single SoC may contain circuitry for digital, analog, mixed-signal, and radio-frequency functions. A single SoC may also include any number of general purpose and/or specialized processors (digital signal processors (DSPs), modem processors, video processors, etc.), memory blocks (e.g., ROM, RAM, flash, etc.), and resources (e.g., timers, voltage regulators, oscillators, etc.), any or all of which may be included in one or more cores.

A number of different types of memories and memory technologies are available or contemplated in the future, all of which are suitable for use with the various aspects of the present disclosure. Such memory technologies/types include dynamic random-access memory (DRAM), static random-access memory (SRAM), non-volatile random-access memory (NVRAM), flash memory (e.g., embedded multimedia card (eMMC) flash), pseudostatic random-access memory (PSRAM), double data rate synchronous dynamic random-access memory (DDR SDRAM), and other random-access memory (RAM) and read-only memory (ROM) technologies known in the art. A DDR SDRAM memory may be a DDR type 1 SDRAM memory, DDR type 2 SDRAM memory, DDR type 3 SDRAM memory, or a DDR type 4 SDRAM memory. Each of the above-mentioned memory technologies includes, for example, elements suitable for storing instructions, programs, control signals, and/or data for use in or by a computer or other digital electronic device. Any references to terminology and/or technical details related to an individual type of memory, interface, standard, or memory technology are for illustrative purposes only, and not intended to limit the scope of the claims to a particular memory system or technology unless specifically recited in the claim language. Mobile computing device architectures have grown in complexity, and now commonly include multiple processor cores, SoCs, co-processors, functional modules including dedicated processors (e.g., communication modem chips, GPS receivers, etc.), complex memory systems, intricate electrical interconnections (e.g., buses and/or fabrics), and numerous other resources that execute complex and power intensive software applications (e.g., video streaming applications, etc.).

Figure 1:
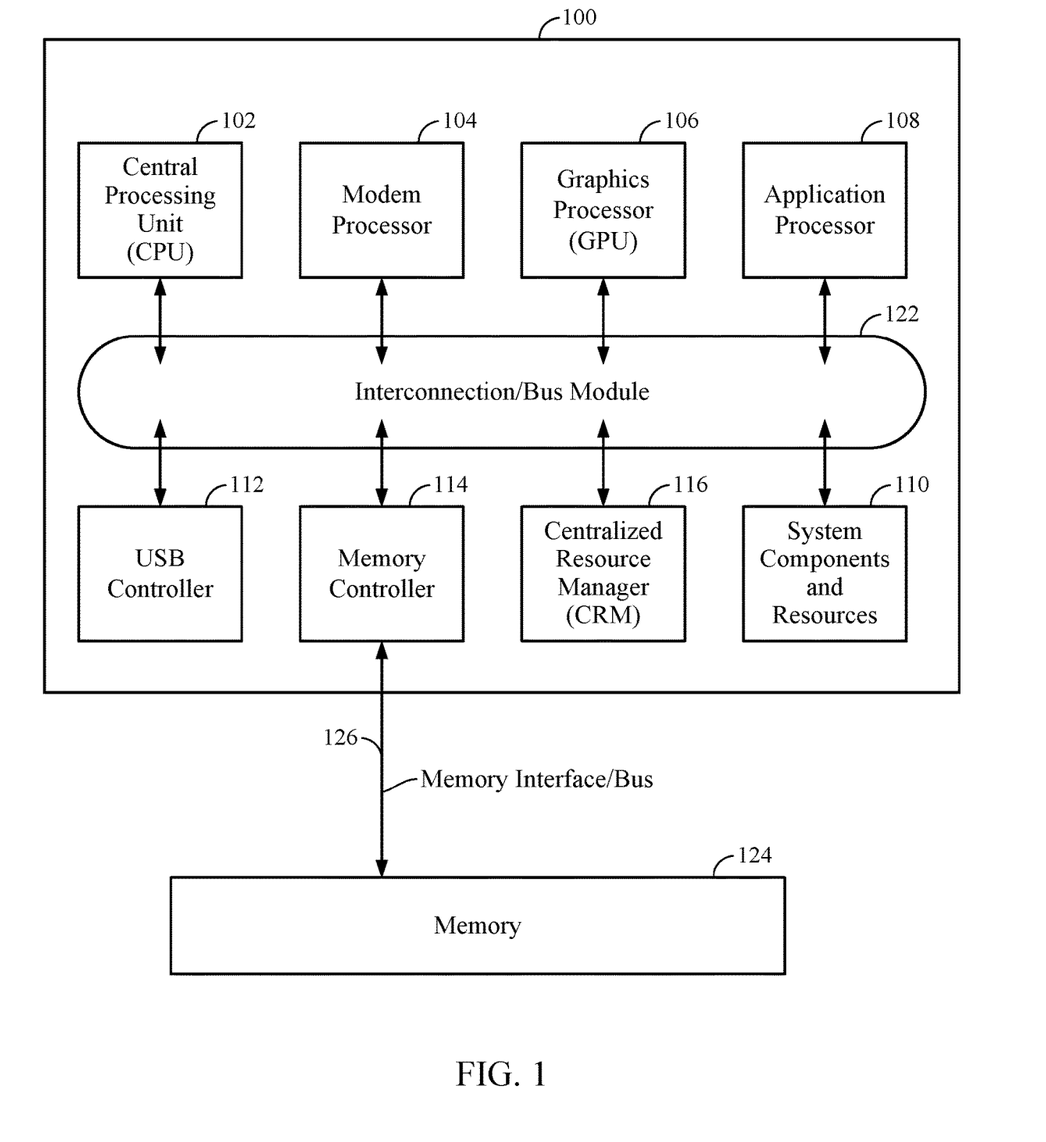
FIG. 1 illustrates example components and interconnections in a system-on-chip (SoC) 100 suitable for implementing various aspects of the present disclosure.

FIG. 1 illustrates example components and interconnections in a system-on-chip (SoC) 100 suitable for implementing various aspects of the present disclosure. The SoC 100 may include a number of heterogeneous processors, such as a central processing unit (CPU) 102, a modem processor 104, a graphics processor 106, and an application processor 108. Each processor 102, 104, 106, 108, may include one or more cores, and each processor/core may perform operations independent of the other processors/cores. The processors 102, 104, 106, 108 may be organized in close proximity to one another (e.g., on a single substrate, die, integrated chip, etc.) so that the processors may operate at a much higher frequency/clock rate than would be possible if the signals were to travel off-chip. The proximity of the cores may also allow for the sharing of on-chip memory and resources (e.g., voltage rails), as well as for more coordinated cooperation between cores.

The SoC 100 may include system components and resources 110 for managing sensor data, analog-to-digital conversions, and/or wireless data transmissions, and for performing other specialized operations (e.g., decoding high-definition video, video processing, etc.). System components and resources 110 may also include components such as voltage regulators, oscillators, phase-locked loops (PLLs), peripheral bridges, data controllers, system controllers, access ports, timers, and/or other similar components used to support the processors and software clients running on the computing device. The system components and resources 110 may also include circuitry for interfacing with peripheral devices, such as cameras, electronic displays, wireless communication devices, external memory chips, etc.

The SoC 100 may further include a Universal Serial Bus (USB) controller 112, one or more memory controllers 114, and a centralized resource manager (CRM) 116. The SoC 100 may also include an input/output module (not illustrated) for communicating with resources external to the SoC, each of which may be shared by two or more of the internal SoC components.

The processors 102, 104, 106, 108 may be interconnected to the USB controller 112, the memory controller 114, system components and resources 110, CRM 116, and/or other system components via an interconnection/bus module 122, which may include an array of reconfigurable logic gates and/or implement a bus architecture (e.g., CoreConnect, AMBA, etc.). Communications may also be provided by advanced interconnects, such as high performance networks on chip (NoCs).

The interconnection/bus module 122 may include or provide a bus mastering system configured to grant SoC components (e.g., processors, peripherals, etc.) exclusive control of the bus (e.g., to transfer data in burst mode, block transfer mode, etc.) for a set duration, number of operations, number of bytes, etc. In some cases, the interconnection/bus module 122 may implement an arbitration scheme to prevent multiple master components from attempting to drive the bus simultaneously.

The memory controller 114 may be a specialized hardware module configured to manage the flow of data to and from a memory 124 (e.g., a DRAM) via a memory interface/bus 126. Certain aspects of the present disclosure are generally directed to a memory implemented using negative capacitance material. For example, the memory 124 may be a DRAM implemented using negative capacitance material, improving the operation efficiency and/or reducing the size of the DRAM, as described in more detail herein.

The memory controller 114 may comprise one or more processors configured to perform read and write operations with the memory 124. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In certain aspects, the memory 124 may be part of the SoC 100.

Example SerDes Communication and Equalization

In order to process and redistribute digital information, data are constantly exchanged between different systems and also between different functional blocks inside a system. Serial communications and parallel communications currently and historically coexist and serve various requirements of intrasystem and intersystem data exchange. In parallel communications, several symbols are sent at one time over a communications link, while in serial communications only one symbol is sent at one time. The choice of one method over another is usually a tradeoff on factors such as speed, cost of materials, power consumption, and difficulty of physical realization. In modern telecommunication systems and computer systems, parallel communications and serial communications are often used simultaneously. Therefore, it is an important task to serialize and deserialize a data stream.

In principle, parallel communications are intrinsically faster than serial communications, because the speed of a parallel data link is equal to the number of symbols sent in parallel times the symbol rate of each individual path. For example, doubling the number of symbols sent at once doubles the data rate. For this reason, parallel communications are widely used in internal buses of integrated circuits and short distance chip-to-chip links. However, certain parallel communications are being replaced by serial communications in high-speed data links. These links include chip-to-chip communications on backplanes, computer networks, computer peripheral buses, long-haul communications, etc. A conventional reason to choose serial communications instead of parallel communications is cost. In long-haul communication systems, copper cables or optical fibers are expensive. Doubling the number of cables or fibers doubles the cost. In chip-to-chip communications, parallel data links occupy more pins, which increases the cost of packaging. Packaging already represents 25% of the total system cost in some electronic products. Nevertheless, the main challenges that deprecate parallel communications in these applications are clock skew, data skew, and crosstalk. Skew is the difference in arrival time of symbols transmitted at the same time. Symbols are basically electromagnetic pulses. Because no electromagnetic wave can travel faster than free space light, the time it takes for a signal to travel from the transmitter to the receiver is determined by the length of the electrical trace or optical link and the group velocity of the signal. Although the difference in arrival times of signals along different paths is usually very small, it can lead to considerable phase difference in high-speed data links, since the frequency is very high. For example, a 1 centimeter path difference causes a 240 degree phase difference for 10 GHz clock signals traveling with a velocity that is a half of the free space light speed. Capacitive coupling, component delay, and process, voltage, and temperature (PVT) variation deteriorate clock skew and data skew. Clock skew can be corrected by a delay-locked-loop (DLL) composed of a variable delay line (VDL) and a control loop, due to the periodical nature of the clock signal. In principle, data skew can also be corrected. However, due to the large number of links and analog nature of the received signals, data skew is much more troublesome in parallel data links. As a consequence, the system has to slow down to wait for the path with the largest delay. Crosstalk is the interference between adjacent data links. When data rate and the number of links increase, crosstalk also tends to increase. In addition, connectors and vias break the continuity of electromagnetic fields, and increase the chance of crosstalk.

Therefore, in high-speed data links, serial communications are rapidly replacing parallel communications. High-speed serial data links include backplane links such as Peripheral Component Interconnect Express (PCIe), computer networking such as Ethernet, computer to peripheral devices such as Universal Serial Bus (USB), multimedia interfaces such as High-Definition Multimedia Interface (HDMI), computer to storage interfaces such as serial AT attachment (ATA), serial attached Small Computer System Interface (SCSI), and high speed telecommunications such as Synchronous Optical Networking (SONET) and Synchronous Digital Hierarchy (SDH).

On the other hand, internal buses of integrated circuits (ICs) and short distance chip-to-chip data links use parallel communications to increase data transfer rate and signal processing speed. In addition, massive data are usually stored in slow devices, such as random access memory (RAM), which have to be accessed in parallel to achieve high-speed. A serializer-deserializer (SerDes) transmitter serves to transmit those parallel data to the receiver through a high-speed serial data link. The SerDes receiver receives data from the serial data link and delivers parallel data to next stage electronic circuits for further signal processing.

Figure 2:
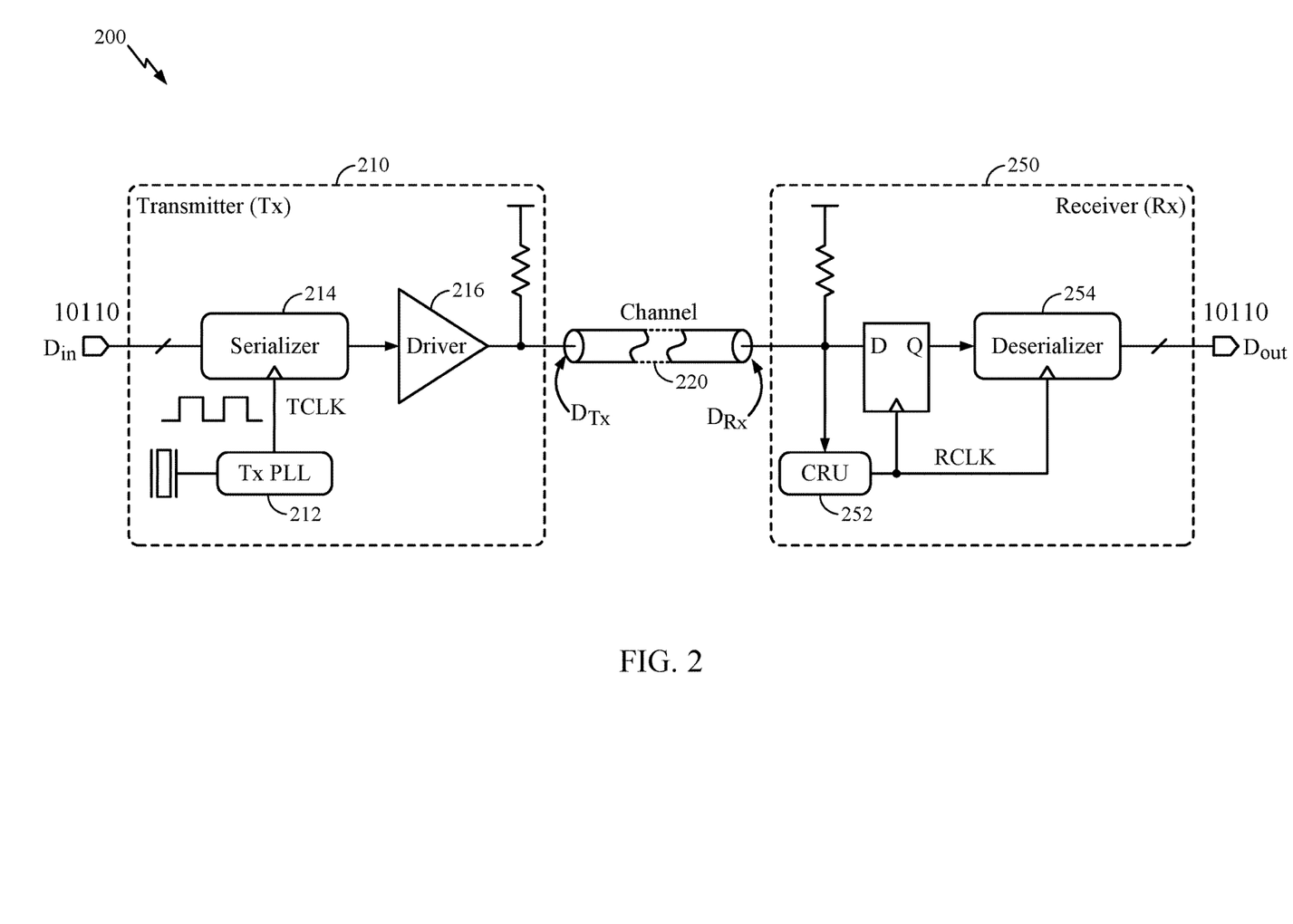
FIG. 2 illustrates an example serializer/deserializer (SerDes) circuit in which aspects of the present disclosure may be practiced.

FIG. 2 illustrates an example SerDes circuit 200 in which aspects of the present disclosure may be practiced.

As shown in FIG. 2, in the transmitter (Tx) side 210, a locally generated clock from Tx phase-locked loop (PLL) 212 is used to serialize N parallel lower frequency bitstreams ($D_{in}$) to full-rate data through serializer 214. An output driver 216 drives full-rate data $D_{Tx}$ on the channel 220. In some cases, equalization may be performed on the output driver 216 at the Tx side 210. On the receiver (Rx) side 250, data DRX may be received from the channel 220, the sampling clock may be recovered from the received signal through a clock recovery unit (CRU) 252, and data is recovered by sampling the received signal using the recovered clock RCLK. The recovered data is deserialized to N parallel lower rate bitstreams ($D_{out}$) through deserializer 254.

Figure 3:
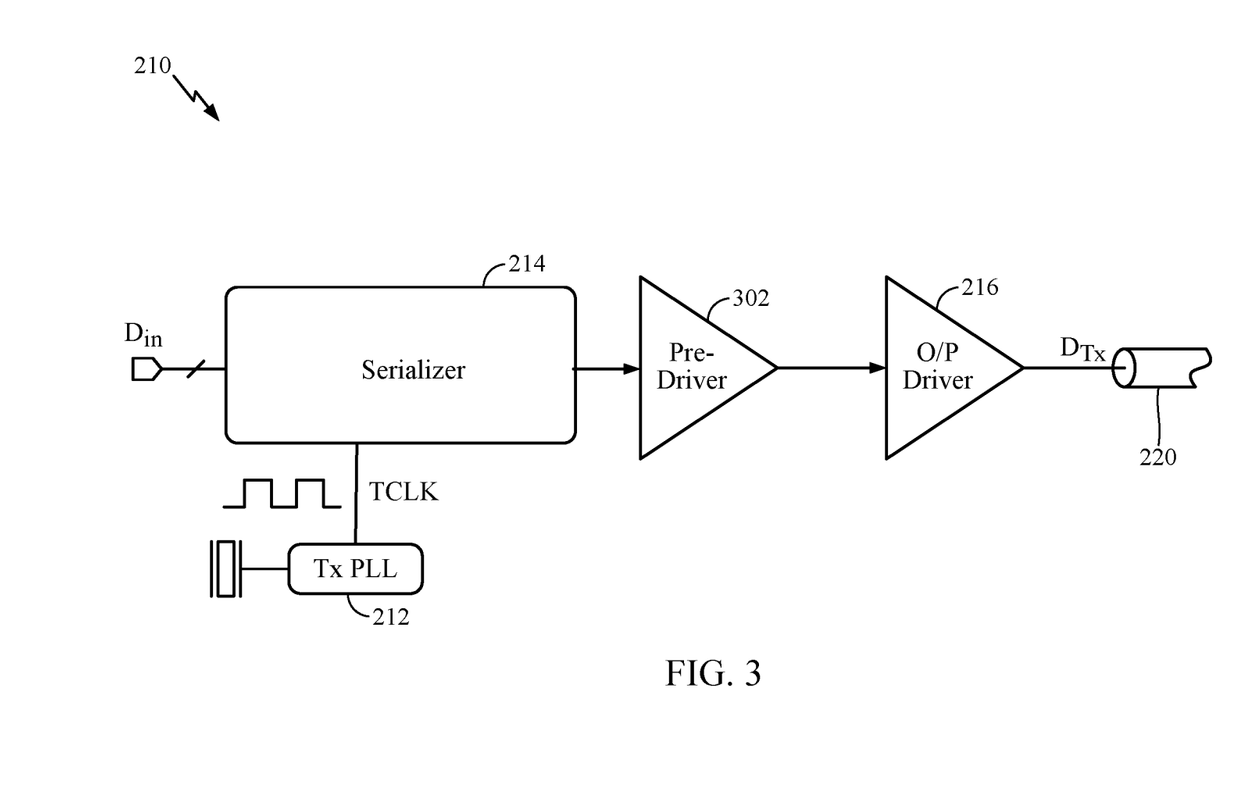
FIG. 3 is a block diagram of an example transmit chain in the SerDes circuit of FIG. 2, in which aspects of the present disclosure may be practiced.

FIG. 3 is an example block diagram of the Tx side 210 of FIG. 2 in which aspects of the present disclosure may be practiced. As shown in FIG. 3, the Tx side 210 includes a serializer 214, pre-driver 302, output (O/P) driver 216, and Tx PLL 212. The pre-driver 302 conditions the input signal (e.g., by known means) before passing it on to the output driver 216.

Generally, the Tx output driver 216 should possess three main features. First, the output driver should have a fixed output impedance that is matched to the characteristic impedance of the channel 220 to guarantee signal integrity. Impedance matching ideally should be independent of output signal swing. Second, an output driver should ideally be amenable for embedding de-emphasis-based equalization without altering the driver's output impedance. Finally, it is important to have control over the magnitude of output swing to optimize signaling power as a function of channel loss. Conventionally, output drivers can be categorized into current-mode-logic (CML)-based output drivers and voltage mode (VM) output drivers.

Power consumption and complexity in serial links are very much dictated by the kind of channel. Starting from the transmitter output, everything which comes in the signal path until the Rx sampler input constitutes the channel. The channel may include bond wire, package parasitics, µ-stripline or stripline metal traces, SMA connectors, connecting cables, etc. A lossy channel attenuates, disperses, and distorts a transmitted signal and makes the signal indistinguishable at the receiver end. A large channel loss leaves little to no timing margin to sample and recover data bits correctly. So, either or both the transmitter and the receiver may incorporate equalizers—such as FFE (feed forward equalizer), CTLE (continuous time linear equalizer), and DFE (decision feedback equalizer)—to compensate, or at least adjust, for channel anomalies.

In recent years, the transfer rate of high-speed serial data links has been ever increasing. Meanwhile, cheap and low quality transmission lines are still extensively used in many applications to save cost. With the increased data rate, various impairments become more and more severe. For example, the channel may exhibit considerable phase distortion and amplitude attenuation at frequencies above 4 GHz. In principle, the impairments of the physical channel can be reduced considerably by replacing the low quality transmission lines with high quality ones and/or by equalization. High quality transmission lines tend to vastly increase the cost, while equalization usually provides an excellent cheaper solution. The impairments of the physical channel are also strongly dependent on the length of the transmission lines. A short transmission line may not need any equalization. In some applications, the length of the transmission lines may vary considerably, and their properties are not time invariant. Therefore, considerable efforts in the design of high-speed serial data links may be paid to adaptivity.

Equalization methods can be linear or nonlinear. An equalizer may be implemented in the transmitter side, the receiver side, or both sides. In microelectronic circuit implementation, the equalizer may be either continuous time (un-sampled) or discrete time (sampled). The signal amplitude can be discrete (digital) or continuous (analog). The equalizer may also be either adaptive or fixed, and the adaptive algorithm may be, for example, zero forcing (ZF), least mean squares (LMS) (or minimum-mean-square-error: MMSE), or some nonlinear approaches. In addition, the equalizer's target response may be either full response or partial response. In the case of a sampling equalizer, it can be baud-rate sampled or over-sampled. Equalizer filter design may be either finite impulse response (FIR) or infinite impulse response (IIR). Therefore, there is quite a large set of combinations of the above equalization schemes. Each scheme has its pros and cons with respect to a specific application.

Example On-Chip and Off-Chip Transmitter Equalization for DDR Applications

Several factors may have to be considered when considering equalization in the context of high-speed data links (e.g., double data rate (DDR) communication systems). In DDR, data is transferred on both the rising and the falling edges of a clock signal, thereby doubling the data rate compared to transferring data on only the rising or only the falling edges of the clock signal.

Generally, the same DDR intellectual property (IP) supports different target markets, such as mobile, compute, automotive, and artificial intelligence (AI). Thus, the same DDR IP may have to support multiple package-on-package (PoP) and external channel topologies. DDR circuits generally use an edge boosting/one-shot scheme for equalization as well as other known methods. However, when used for off-chip equalization, the edge boosting/one-shot-based equalization scheme introduces reflections and crosstalk between data lines. Generally, in a short channel with multiple bits routed close-by, this scheme degrades the transmitter output eye due to reflections and crosstalk between high-speed data lines.

Additionally, the electrostatic discharge (ESD) specifications for different target markets vary as a function of the package size corresponding to the use case. For example, an automotive package is generally bigger than a mobile package and typically demands more ESD protection. Since the same DDR IP is reused for multiple markets and use cases, such DDR IP may be designed to support the ESD specifications for the biggest package. This generally results in a higher ESD capacitance due to the ESD diodes at the transmitter output. Adding more capacitance at the high-speed output node of the transmitter may most likely be prohibitive for higher frequencies. However, off-chip equalization at the transmitter (e.g., driver output pad) may add additional capacitance at the transmitter output.

Certain aspects of the present disclosure provide techniques for equalization in a transmitter circuit (e.g., a transmitter circuit used in a high-speed DDR scheme) that attempt to mitigate the problems and/or limitations of off-chip equalization presently used in transmitter circuits. The discussed techniques include providing on-chip equalization before the driver stage of the transmitter circuit (e.g., at or before the driver input pad). In an aspect, the on-chip transmitter equalization—independently or in combination with existing off-chip equalization—enables the same transmitter design to support multiple PoPs and external channels across multiple market segments. In an aspect, the on-chip transmitter equalization described herein does not add any new impedance mismatches and further does not modulate the output voltage swing. Further, the on-chip transmitter equalization described herein also helps with equalization without loading the transmitter output. Additionally, the on-chip equalization does not add any additional capacitance at the high-speed transmitter output node.

Figure 4:
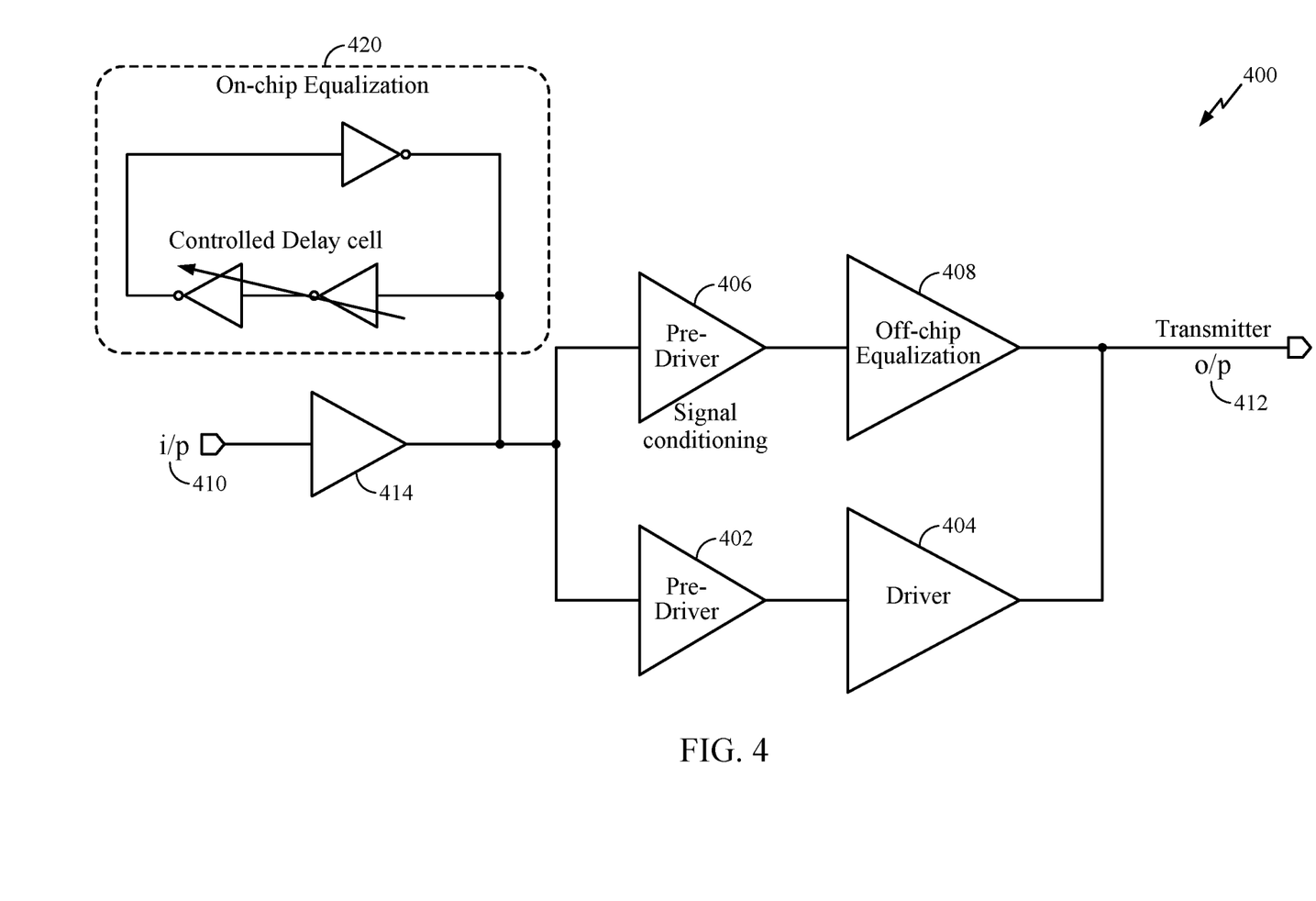
FIG. 4 illustrates example equalization in a transmitter circuit (e.g., as used in high-speed double data rate (DDR) communication), in accordance with certain aspects of the present disclosure.

FIG. 4 illustrates example equalization in a transmitter circuit 400 (e.g., as used in high-speed DDR communication), in accordance with certain aspects of the present disclosure. In an aspect, the transmitter circuit is a low-power double data rate (LPDDR) transmitter circuit.

The transmitter circuit 400 includes one or more driver stages for amplifying and/or buffering signals, such as pre-driver 402 and a driver 404 as depicted in FIG. 4. As shown, the output of the pre-driver 402 is coupled to the input of the driver 404. The output of the driver 404 is coupled to the transmitter output 412. In an aspect, the transmitter circuit may include multiple transmit chains, each including one or more driver stages (e.g., in a similar configuration as the pre-driver 402 and the driver 404), with the outputs of each transmit chain coupled to the transmitter output 412.

As shown in FIG. 4, the transmitter circuit 400 further includes an off-chip equalization stage used for equalization at the transmitter output (e.g., at the transmitter output pad, such as the output pad of the driver 404). As shown, the off-chip equalization stage includes a pre-driver 406 used for signal conditioning and an off-chip equalization circuit 408. The input of the pre-driver 406 is coupled to the input of pre-driver 402 and, in some cases, may be selectively coupled to the inputs of pre-drivers in any additional transmit chains. The output of the pre-driver 406 is coupled to the input of the off-chip equalization circuit 408. The output of the off-chip equalization circuit 408 is coupled to the transmitter output 412, as well as to the output of the driver 404 and, in some cases, to the outputs of drivers of any additional transmit chains. In an aspect, the off-chip equalization circuit 408 may be implemented by using any known or as yet unknown equalization method.

As shown in FIG. 4, the transmitter circuit 400 further includes a data buffer 414 with the input of the data buffer coupled to the input 410 of the transmitter circuit 400 and the output of the data buffer 414 coupled to the inputs of the pre-drivers 402 and 406.

As shown in FIG. 4, the transmitter circuit 400 further includes an on-chip equalization circuit 420 coupled to the input of the pre-drivers 402 and 406. In some cases, the on-chip equalization circuit 420 may be selectively coupled to inputs of pre-drivers of any additional transmit chains. As shown, the on-chip equalization circuit 420 may include at least one controlled delay cell, which may be tuned to adjust a delay. In an aspect, each controlled delay cell is a controlled unit interval delay cell. In an aspect, the controlled delay cell may be configured to introduce a unit interval delay for the on-chip equalization. In an aspect, the unit interval delay may be implemented by using a flip-flop or any other method that can introduce one or more unit interval delays. In an aspect, the controlled delay element may be implemented by multiple methods. For example, the delay may be calibrated by replica matching or based on a clocking scheme. The delay element may be clocked, delay matched, replica biased, or use any of various other suitable methods, known or as yet unknown.

In an aspect, each of the on-chip equalization circuit 420 and the off-chip equalization circuit 408 may be selectively enabled. For example, only on-chip equalization circuit 420 may be enabled, only the off-chip equalization circuit 408 may be enabled, both the on-chip equalization circuit 420 and the off-chip equalization circuit 408 may be enabled, or both may be disabled at one time.

As shown in FIG. 4, the off-chip equalization is carried out at the transmitter output. The on-chip equalization precedes the transmit drivers. Thus, on-chip equalization may refer to equalization that is done before the pad (e.g., at the input to the pre-driver), whereas off-chip equalization may refer to equalization that is done at the transmitter output pad (e.g., driver pad). Thus, the off-chip equalization equalizes the signal at the pad, and the on-chip equalization equalizes the signal before the pad. The methods presently used for off-chip equalization involve additional overhead to maintain impedance matching at the transmitter output. For example, a one-shot methodology may be used that modulates the output resistance, which is not ideal for signal integrity purposes. By moving the equalization of the signal before the pre-driver stage, these problems are taken care of before the pre-driver, and there is no interfering with the transmitter output. There are several advantages of the on-chip equalization (as shown in FIG. 4) over the off-chip equalization. For example, the on-chip equalization, when enabled, equalizes the signal without adding additional capacitance at the high-speed transmitter output. Further, the on-chip equalization does not change the output swing level and does not introduce new impedance mismatches. Additionally, the on-chip equalization circuit has a very small area overhead.

Figure 5:
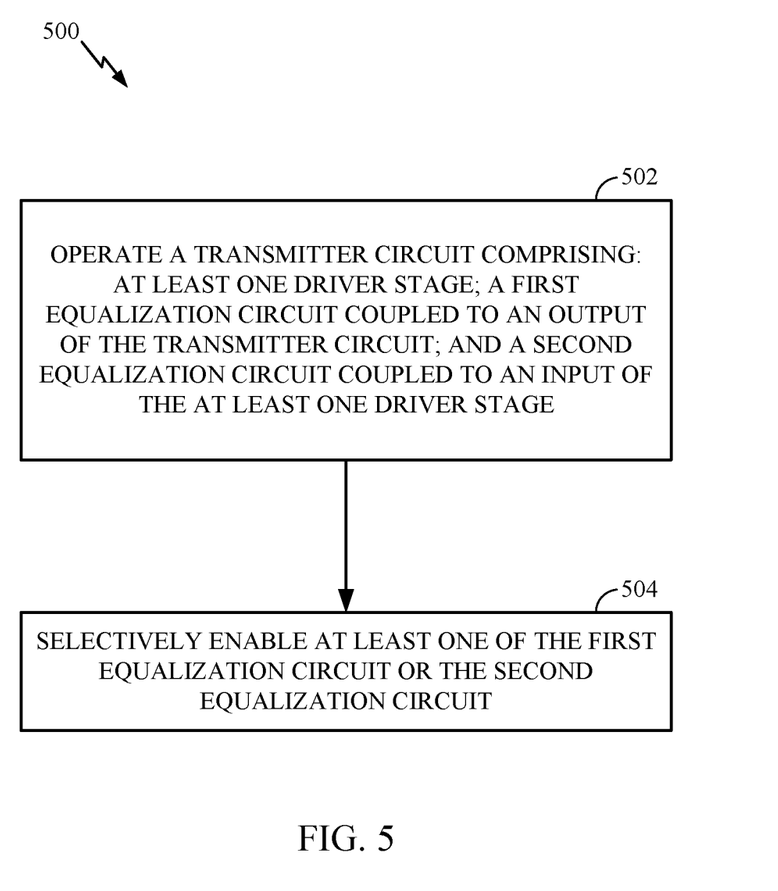
FIG. 5 illustrates example operations for transmitting data, in accordance with certain aspects of the present disclosure.

FIG. 5 illustrates example operations 500 for operating a transmitter circuit (e.g., transmitter circuit 400 of FIG. 4) with transmitter equalization, in accordance with certain aspects of the present disclosure.

Operations 500 begin, at block 502, by operating a transmitter circuit (e.g., by driving a serial bitstream). The transmitter circuit includes at least one driver stage (pre-driver 402 and driver 404), a first equalization circuit (e.g., off-chip equalization circuit 408) coupled to an output of the transmitter circuit, and a second equalization circuit (e.g., on-chip equalization circuit 420) coupled to an input of the at least one driver stage.

At block 504, at least one of the first equalization circuit or the second equalization circuit is selectively enabled.

In an aspect, the selectively enabling at block 504 comprises selectively enabling both the first equalization circuit and the second equalization circuit.

In an aspect, the at least one driver stage comprises a first pre-driver stage (e.g., pre-driver 402) and a driver stage (e.g., driver 404). In this case, the operating at block 502 may involve amplifying an input signal with the first pre-driver stage to generate an amplified input signal and transmitting the amplified input signal with the driver stage (to generate an output signal for the transmitter circuit), wherein an output of the first equalization circuit is coupled to an output of the driver stage. In an aspect, the at least one driver stage further comprises a buffer stage (e.g., buffer 414). In this case, the operating at block 502 may further entail buffering a data signal (e.g., a digital bitstream) for the transmitter circuit with the buffer stage, in which case the input signal comprises the buffered data signal. Furthermore, an output of the second equalization circuit may be coupled to the output of the buffer stage.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage, or mode of operation. The term "coupled" is used herein to refer to the direct or indirect coupling between two objects. For example, if object A physically touches object B and object B touches object C, then objects A and C may still be considered coupled to one another—even if objects A and C do not directly physically touch each other. For instance, a first object may be coupled to a second object even though the first object is never directly physically in contact with the second object. The terms "circuit" and "circuitry" are used broadly and intended to include both hardware implementations of electrical devices and conductors that, when connected and configured, enable the performance of the functions described in the present disclosure, without limitation as to the type of electronic circuits.

The apparatus and methods described in the detailed description are illustrated in the accompanying drawings by various blocks, modules, components, circuits, steps, processes, algorithms, etc. (collectively referred to as "elements"). These elements may be implemented using hardware, for example.

One or more of the components, steps, features, and/or functions illustrated herein may be rearranged and/or combined into a single component, step, feature, or function or embodied in several components, steps, or functions. Additional elements, components, steps, and/or functions may also be added without departing from features disclosed herein. The apparatus, devices, and/or components illustrated herein may be configured to perform one or more of the methods, features, or steps described herein. The algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover at least: a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c). All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

What is claimed is:

1. A transmitter circuit comprising:
   at least one driver stage;
   a first equalization circuit coupled to an output of the transmitter circuit; and
   a second equalization circuit coupled to an input of the at least one driver stage, wherein the second equalization circuit is configured to be selectively enabled and wherein an input of the second equalization circuit is coupled in a loop to an output of the second equalization circuit.

2. The transmitter circuit of claim 1, wherein the first equalization circuit is configured to be selectively enabled.

3. The transmitter circuit of claim 2, wherein the first and the second equalization circuits are configured to be selectively enabled, such that at a particular time both the first and second equalization circuits may be enabled, either the first or the second equalization circuit may be enabled, or neither the first or the second equalization circuit may be enabled.

4. The transmitter circuit of claim 1, wherein:
   the at least one driver stage comprises a first pre-driver stage and a driver stage;
   an output of the first pre-driver stage is coupled to an input of the driver stage; and
   an output of the first equalization circuit is coupled to an output of the driver stage.

5. The transmitter circuit of claim 4, further comprising a second pre-driver stage, wherein:
   an input of the second pre-driver stage is coupled to an input of the first pre-driver stage; and
   an output of the second pre-driver stage is coupled to an input of the first equalization circuit.

6. The transmitter circuit of claim 4, wherein:
   the at least one driver stage further comprises a buffer stage having an output coupled to the input of the first pre-driver stage; and
   an output of the second equalization circuit is coupled to the output of the buffer stage.

7. The transmitter circuit of claim 1, wherein the second equalization circuit comprises at least one controlled delay cell.

8. The transmitter circuit of claim 1, wherein the transmitter circuit is a low-power double data rate (LPDDR) transmitter circuit.

9. A method of transmitting data, comprising:
   operating a transmitter circuit comprising:
      at least one driver stage;
      a first equalization circuit coupled to an output of the transmitter circuit; and
      a second equalization circuit coupled to an input of the at least one driver stage, wherein an input of the second equalization circuit is coupled in a loop to an output of the second equalization circuit; and
   enabling at least one of the first equalization circuit or the second equalization circuit.

10. The method of claim 9, wherein the at least one driver stage comprises a first pre-driver stage and a driver stage and wherein the operating comprises:
    amplifying an input signal with the first pre-driver stage to generate an amplified input signal; and
    transmitting the amplified input signal with the driver stage, wherein an output of the first equalization circuit is coupled to an output of the driver stage.

11. The method of claim 10, wherein:
    the at least one driver stage further comprises a buffer stage;
    the operating further comprises buffering a data signal for the transmitter circuit with the buffer stage;
    the input signal comprises the buffered data signal; and
    an output of the second equalization circuit is coupled to the output of the buffer stage.

12. The method of claim 9, wherein the transmitter circuit is a low-power double data rate (LPDDR) transmitter circuit.

13. The method of claim 9, wherein the second equalization circuit comprises at least one controlled delay cell.

14. The method of claim 9, wherein the enabling comprises enabling both the first equalization circuit and the second equalization circuit.

15. A transmitter circuit comprising:
    at least one driver stage;
    a first equalization circuit coupled to an output of the transmitter circuit;
    a second equalization circuit coupled to an input of the at least one driver stage, wherein:

the at least one driver stage comprises a first pre-driver stage and a driver stage; and an output of the first equalization circuit is coupled to an output of the driver stage; and a second pre-driver stage, wherein:

an input of the second pre-driver stage is coupled to an input of the first pre-driver stage; and an output of the second pre-driver stage is coupled to an input of the first equalization circuit.

16. The transmitter circuit of claim 15, wherein an output of the first pre-driver stage is coupled to an input of the driver stage.

17. The transmitter circuit of claim 15, wherein:

the at least one driver stage further comprises a buffer stage having an output coupled to the input of the first pre-driver stage; and an output of the second equalization circuit is coupled to the output of the buffer stage.

18. The transmitter circuit of claim 15, wherein the first equalization circuit is configured to be selectively enabled.

19. The transmitter circuit of claim 15, wherein the second equalization circuit comprises at least one controlled delay cell.

\* \* \* \* \*